United States Patent
McCrosky

(10) Patent No.: US 7,391,787 B1
(45) Date of Patent: Jun. 24, 2008

(54) SYSTEM AND METHOD FOR OPPORTUNISTIC REQUEST-GRANT SWITCHING

(75) Inventor: Carl Dietz McCrosky, Saskatoon (CA)

(73) Assignee: PMC-Sierra, Inc., Santa Clara, CA (US)

( * ) Notice: Subject to any disclaimer, the term of this patent is extended or adjusted under 35 U.S.C. 154(b) by 718 days.

(21) Appl. No.: 10/937,469

(22) Filed: Sep. 10, 2004

Related U.S. Application Data

(60) Provisional application No. 60/501,861, filed on Sep. 11, 2003.

(51) Int. Cl.
*H04L 12/56* (2006.01)

(52) U.S. Cl. .................. 370/413; 370/428; 370/429

(58) Field of Classification Search ........... 370/428, 370/429, 229, 413
See application file for complete search history.

(56) References Cited

U.S. PATENT DOCUMENTS

| | | | |
|---|---|---|---|
| 5,065,398 A * | 11/1991 | Takashima | ........... 370/230 |
| 6,212,182 B1 | 4/2001 | McKeown | |
| 6,515,991 B1 | 2/2003 | McKeown | |
| 7,035,212 B1 * | 4/2006 | Mittal et al. | ........... 370/230 |
| 7,042,891 B2 * | 5/2006 | Oberman et al. | ........... 370/412 |
| 7,079,485 B1 * | 7/2006 | Lau et al. | ........... 370/229 |
| 2002/0075883 A1 * | 6/2002 | Dell et al. | ........... 370/413 |
| 2004/0223452 A1 * | 11/2004 | Santos et al. | ........... 370/229 |

* cited by examiner

*Primary Examiner*—Hassan Kizou
*Assistant Examiner*—Jeffrey M Rutkowski
(74) *Attorney, Agent, or Firm*—Curtis B. Behmann; Borden Ladner Gervais LLP

(57) ABSTRACT

A method and system are provided for opportunistic request-grant switching. If an ingress has no granted payload segment to send, and a flow exists which requires a request to be sent, an opportunistic payload segment is sent including a request and a payload segment related to the request. If an opportunistic payload segment is sent and the payload is dropped, the request is kept and is then treated as a regular request-grant request. The ingress port consequently only has to transmit the payload a maximum of twice. Ingress ports can thus opportunistically exploit the low latency available when egress ports are not contended for, and yet fall back on the strong fairness and quality of service (QoS) assurances of request-grant semantics. Buffering in the switch core can optionally be implemented to extend performance gains, but fairness and QoS are not dependent on this buffering.

18 Claims, 9 Drawing Sheets

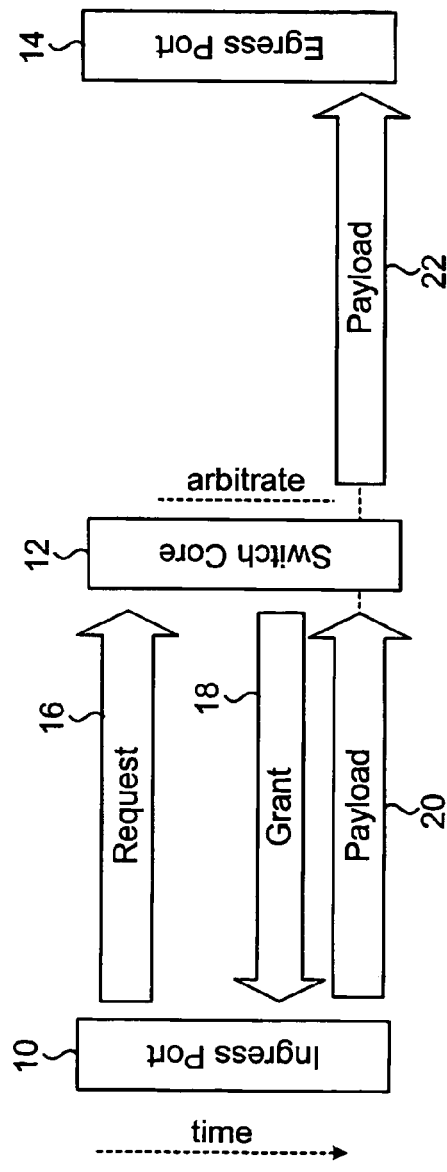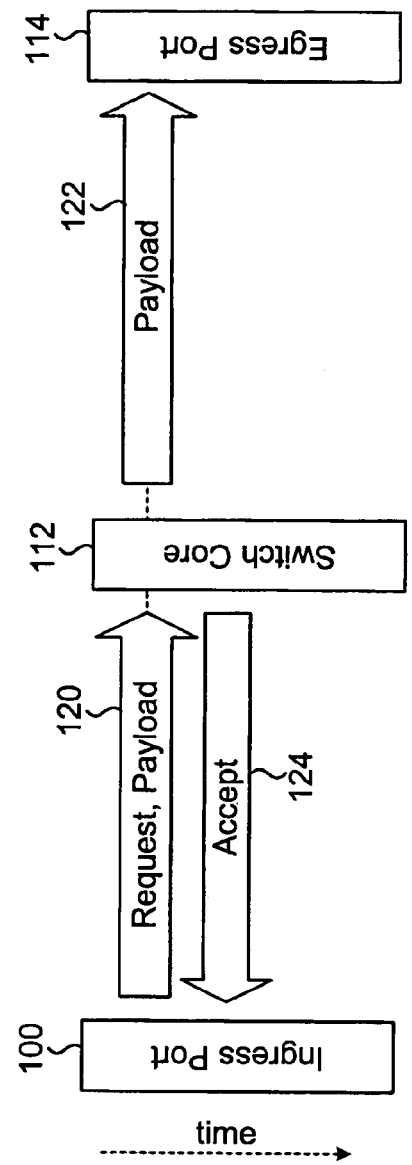

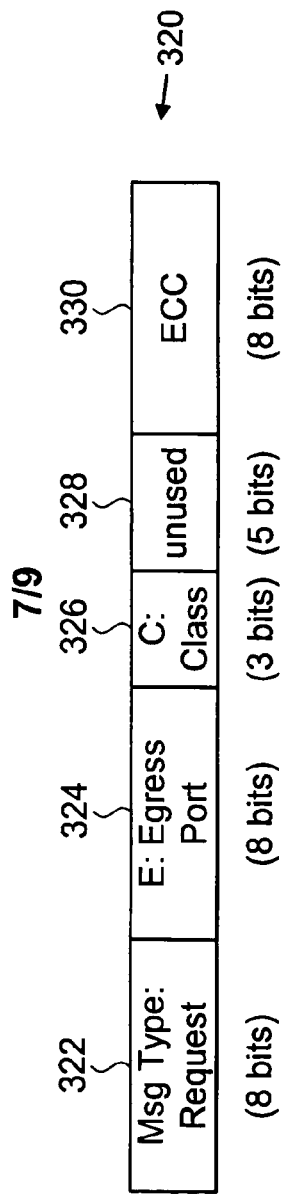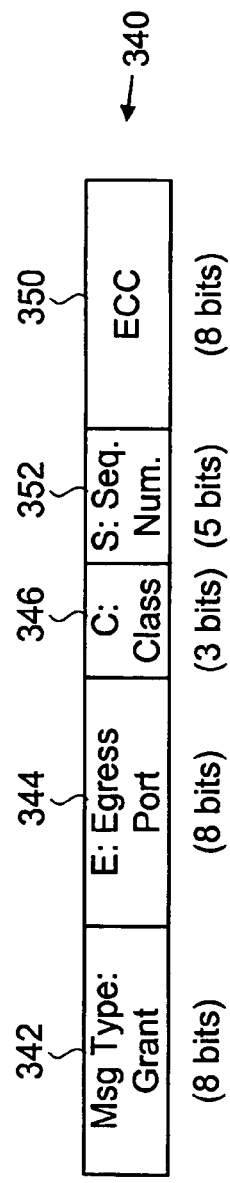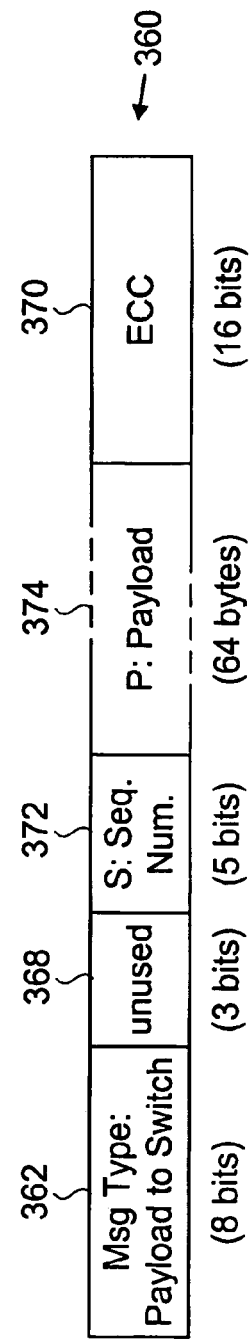

SYSTEM AND METHOD FOR OPPORTUNISTIC REQUEST-GRANT SWITCHING

CROSS REFERENCE TO RELATED APPLICATIONS

This application claims the benefit of U.S. Provisional Application No. 60/501,861, filed Sep. 11, 2003, which is incorporated herein by reference.

FIELD OF THE INVENTION

The present invention relates generally to data switching and switch fabrics. More particularly, the present invention relates to switch fabrics implementing virtual output queues and request-grant protocols.

BACKGROUND OF THE INVENTION

The design of switch fabrics for applications in telecom, datacom, and many related applications is a long-standing problem, with a long history of solutions. This section presents a general definition of the problem.

1) There are N nodes in a system which require the ability to exchange messages with each other. Each node is attached to one of N switch ports on a switch fabric. Generally any port can send a message to any other port; there are thus $N^2$ possible ingress-to-egress flows (or $Nx(N-1)$ if self-to-self flows are ruled out).

2) In any (unicast) message exchange, one port acts as an ingress port, or source of the message, and one port acts as an egress port, or sink for the message.

3) The messages are generally transmitted as payload segments, which may be of small fixed length (e.g., ATM cells of 53 bytes), or of variable length, possibly extending up to thousands of bytes (e.g., TCP/IP packets).

4) Where messages are longer than payload segments, some component of the ingress port must segment the message into multiple payload segments. Some component in the egress port must then reassemble the message from the payload segments.

5) Switches generally support multiple classes of traffic. In such systems, each payload segment carries a class identifier. Packets of differing classes may have differing switching priorities. In a switching system with N ports and C classes, there are $N^2*C$ distinct flows (flows have distinct sources, sinks, and classes).

6) Most switching systems have some policy of quality of service (QoS). In general, QoS means that higher priority (or higher priority class) payload segments should take priority over lower priority segments, but there are many possible QoS policies. Priorities are associated with classes.

7) Most switching systems have some policy of fairness. In general, fairness means:

a. within each priority class, ingress ports should fairly distribute their offered traffic over all egress ports, and b. within each priority class, egress ports should accept offered traffic evenly from all ingress ports.

8) Switches, in general, are subject to contention. There may be more payload segments addressed to some egress port than that egress port can consume. Such over-subscription may be short lived or long lived.

9) Ideally, switches should support their QoS and fairness policies even when presented with congesting traffic loads. In fact, many switches fail to accomplish this requirement.

10) Switches should minimize the amount of ingress port to switch core and switch core to egress port bandwidth that is consumed by control information (headers and other control segments).

11) Switches should be work conserving in the sense that egress ports should be kept full whenever there is offered load anywhere on the ingress side.

12) Switches should complete the transmission of payload segments from ingress ports to egress ports with minimal latency.

There is a large variety of applications of switch fabrics. In the more general solutions, there are traffic management (TM) devices connected to each port of the fabric. These TM devices may provide buffering in the ingress and egress paths (to and from the switch core). Independent of TM buffering, there may be buffering in the switch core itself. Our present focus is on the presence or absence of buffers in the switch core, independent of the presence or absence of buffering in TM devices or other devices attached to the ports of the switch fabric. Many switch fabric designs do require core buffering; this is a significant cost which must be considered in the design of switch cores.

There have been many tradeoffs in the design of switch fabrics. It is possible to build centrally buffered fabrics which fairly enforce a defined quality of service (QoS) and achieve minimal switching latency when possible. Central buffering has severely limited the maximal size of switching fabrics, as the physical realization of these buffers (or access to these buffers) has been limited by properties of underlying technologies such as CMOS. Fairness and/or QoS have often been compromised when full central buffering is abandoned to gain scalability.

Consider a buffering switch with N ports and C traffic classes. How many central buffers does it require to avoid a buffer starvation situation that could compromise either fairness or the QoS policy? Recall that this switch has $N^2*C$ flows. Now consider the latency of the switch as any single flow runs at 'wire speed'. This number (L), rounded up to the next highest integer is the number of buffers required by the flow to maintain wire speed transmission. In most buffered switch designs, L is at least two, as one buffer is being filled while another is being emptied. Each buffer requires X bits.

The worst case fabric buffering requirement for this scenario is $N^2*C*L*X$ bits: a full set of wire speed buffers for each flow. Even a modest reduction in this buffer count can lead to a compromise of fairness or QoS enforcement (depending on the QoS definition). It turns out that the probability of maintaining fairness and QoS with a varying number of buffers asymptotically approaches certainty with many fewer than $N^2*C*L$ buffers. But there are always corner cases which can lead to fairness or QoS failures when there are fewer than $N^2*C*L$ buffers. Whether a small probability of failure matters is a function of the application, but there are many applications in which customers will not accept any probability of QoS failure. Often this insistence is more due to a reluctance to write control software to deal with the failure than due to the existence of the failure itself. But it is easy to imagine applications in which the possibility of failure is completely unacceptable (e.g., medical systems, flight control systems, or weapons control systems).

The key issue is that the number of buffers required for complete flow isolation (and fairness/QoS assurance) scales quadratically with the number of ports, N. In many applications, a large N is important, and this $N^2*C*L*X$ buffering cost comes to dominate the cost and even the feasibility of the switch core. The problem is much worse for applications that transfer very large payload segments (e.g., TCP/IP packets), as each payload segment requires a buffer.

There are two bodies of prior art in the area of switching technologies that are worth considering in this discussion: 1) the general area of virtual output queue (VOQ) switches, and 2) the area of request-grant switch fabric interface design.

The general concept of VOQ switches is that ingress ports maintain separate queues for each output, and that these various queues compete through the switch fabric for access to one 'virtual' output queue in each egress. The concept of VOQ switching is well known to those of skill in the art.

Request-grant protocols are one way to implement portions of VOQ switches. U.S. Pat. Nos. 6,212,182 and 6,515,991, both entitled "Combined Unicast and Multicast Scheduling" and assigned to Cisco Technology Inc., relate to request-grant semantics, though they relate particularly to the issue of multicast traffic. Both of those patents are incorporated herein by reference in their entirety.

The advent of request-grant switch interface semantics and virtual output queue switch design represent a significant advance in the art of switch fabric design. The key ideas of this approach are:

1) All buffering of payload contents should take place in the ingress ports, not in the switch fabric itself. This avoids the concentration of buffering costs in the critical switch fabric, where buffering costs have either increased the cost or reduced the scalability of earlier switch fabric designs. It is possible to provide full wire-speed per flow buffering when the buffering is divided into N separate portions and placed in the N ports, as each port requires only $N*C*L*X$ bits.

2) Ingress ports send requests to the switch core. Requests carry the information that one (or more) payload segment(s) is(are) to be transferred through the switch from the ingress port which submitted the request to an egress port named in the request, at a class named in the request. The ingress port holds the associated payload segment until the switch core returns a grant to the ingress port.

3) The switch core stores received requests as counts. Each supported flow (<ingress port, egress port, class>) in the switch core has its own count.

4) The switch core treats non-zero flow counts as bids for output ports.

5) The switch core arbitrates among all bids fairly by class for access to egress ports.

6) The switch core notifies the ingress ports associated with winning bids of their success by sending them grant control segments, which indicate which flow can accept a previously requested payload segment.

7) The ingress port responds to grants by sending the payload segment associated with the grant (also associated with the earlier request). All ingress ports receive their grants in a nearly synchronous batch, and reply with their granted payload segments in a nearly synchronous wave. The switch core temporally aligns this wave of arriving payload segments (using small internal FIFOs) for synchronous switching through the internal, synchronous, switching paths. This method of switching is most efficient when all payload segments are of one common size.

8) The switch core forwards the payload segment received from the ingress port to the appropriate output port. This forwarding may be done in a cut-through manner, or in a store-and-forward manner.

FIG. 1 illustrates a standard request-grant message/time diagram. From left to right, the diagram shows an ingress port 10, a switch core 12, and an egress port 14. The left-to-right arrows represent control and/or payload messages. The top to bottom direction corresponds to increasing time. Flow number 16 indicates that the ingress port 10 sends a Request control segment to the switch core; the Request is from ingress port I, to egress port E, at class C. The switch core 12 responds by incrementing the corresponding request count, for <I, E, C>. The switch core 12 begins to consider this request count (now certainly greater than zero) in its regular arbitrations for output ports. At some time this request, <I, E, C>, wins the arbitration for egress E. At flow number 18, the switch core 12 then sends a Grant control segment containing <E, C> to port I. Ingress port I then returns, as part of flow number 20, the next payload segment destined for the flow <E, C>. The switch core forwards, as part of flow number 22, the received payload segment to egress port E. The forwarding may begin as soon as the segment begins to arrive in the core (cut-through), or may wait until the entire segment arrives (store and forward).

The primary benefits of this scheme are: 1) Payload segments need not be stored in the core (except possibly one segment per ingress port (I) during the process of forwarding the segment to the intended egress port (E)); and 2) As the switch core has a representation of every request in the form of a non-zero flow request count, the switch core can make as fair a decision as desired regarding which requests to honour during the next segment transfer time. Thus QoS can be enforced, with maximal fairness.

So, it can be seen that request-grant semantics are a development which avoids central buffering, so buffers can be distributed over the numerous ports. This allows the technology scaling problem to be avoided. At the same time, request-grant semantics preserve fairness and QoS.

However, the request-grant protocol introduces additional latency to the process of passing payload segments through the switch core. Even in the presence of an otherwise idle input and egress port pair, the transfer of a payload segment must wait for a request, a successful arbitration, a grant, and the time it takes the ingress port to retrieve the payload segment to be forwarded. Added latency is undesirable in many applications, especially those in which two (or more) processes communicate very frequently in a ping-pong fashion, and only one process or the communications channel can be active at any time.

It is, therefore, desirable to provide an approach that retains the advantages of request-grant semantics, while also supporting minimal latency when egresses are idle.

SUMMARY OF THE INVENTION

It is an object of the present invention to obviate or mitigate at least one disadvantage of previous switching arrangements.

Embodiments of the present invention relate to an extension to request-grant semantics which simultaneously gains all four of the key objectives of switch design: 1) fairness, 2) QoS, 3) low latency, and 4) scalability. This unique combination of positive features is due to mechanisms which allow ingress ports to opportunistically exploit the low latency available when egress ports are not contended for, and yet fall back on the strong fairness and QoS assurances of request-grant semantics. These extensions optionally make use of buffering in the switch core, but fairness and QoS are not dependent on this buffering; buffering is added as economically possible to extend the performance gains available with the mechanisms described herein, but buffering is not required.

In a first aspect, the present invention provides a method of opportunistic request-grant switching in a switch having ingress ports, a switch core, and egress ports. The method includes the following steps: receiving a bid at the switch core, the bid having a request and a related payload; dropping the related payload in response to a determination of unavailability of a destination egress port; and retaining the request at the switch core for treatment as a request-grant request.

In some embodiments, the determination of unavailability of the destination egress port can include a determination of unavailability of a free buffer at the switch core. The step of dropping the related payload can include notifying an egress to send a drop, the egress being associated with an originating ingress port. The method can further comprise storing the related payload in a free buffer in response to a determination of availability of the free buffer, and optionally marking the payload as cut-through and incrementing a flow count for a flow associated with the request. The treatment as the request-grant request can include: receiving a granted payload segment from an origin ingress port upon granting of the request-grant request; and forwarding the granted payload segment from the switch core to the destination egress port. The method can further include forwarding the related payload to the destination egress port as a cut-through in response to a determination of the availability of the destination egress port, and optionally sending an accept message to an egress associated with an origin ingress port.

In another aspect, there is provided an ingress device for communicating with a switch core in a data switch. The ingress device includes: determining means for determining that a bid to be sent is to include a request and a related payload; send means for sending the bid to the switch core; and payload management means for holding a copy of the related payload for retransmission pending receipt of a grant message.

In some embodiments, the determining means can include means for determining that the bid to be sent is to include the request and the related payload in response to a determination in an immediately preceding time cycle that no grant has been received which requires sending a granted payload segment. The payload management means can include means for discarding the copy of the payload in response to receipt of an accept message from the switch core. The payload management means can include means for sending the copy of the payload to the switch core with a sequence number in response to receipt of the grant message. The ingress device can further include a message type identifying means, for identifying a message type associated with a received message.

In a further aspect, there is provided a switch core for opportunistic request-grant switching, the switch core being in communication with ingress ports and egress ports. The switch core includes: a receiver for receiving a bid at the switch core, the bid having a request and a related payload; payload management means for dropping the related payload in response to a determination of unavailability of a destination egress port; and storage means for retaining the related request at the switch core for treatment as a request-grant request.

In some embodiments, the payload management means can include means for dropping the related payload in response to a determination of unavailability of a free buffer at the switch core. The payload management means can include notification means for notifying an egress to send a drop, the egress being associated with an originating ingress port. The switch core can further include: a buffer for retaining the related payload; and a buffer availability indicator for indicating an availability of the buffer. The switch core can further include transmit means for forwarding the related payload to the destination egress port as a cut-through in response to a determination of availability of the destination egress port, and the transmit means can include means for sending an accept message to an egress associated with an origin ingress port. The switch core can further include: means for receiving a granted payload segment from an origin ingress port upon granting of the request-grant request; and means for forwarding the granted payload segment from the switch core to the destination egress port.

In a yet further aspect, the present invention provides a computer-readable storage medium including statements and instructions which, when executed, cause a computer to perform the steps of: receiving a bid at a switch core, the bid having a request and a related payload; dropping the related payload in response to a determination of unavailability of a destination egress port; and retaining the request at the switch core for treatment as a request-grant request.

In a still further aspect, the present invention provides a computer data signal embodied in a carrier wave, comprising computer instructions for: receiving a bid at a switch core, the bid having a request and a related payload; dropping the related payload in response to a determination of unavailability of a destination egress port; and retaining the request at the switch core for treatment as a request-grant request.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a standard request-grant message/time diagram;

FIG. 2 is a cut-through message/time diagram;

FIG. 9 illustrates a request message format;

FIG. 10 illustrates a grant message format;

FIG. 11 illustrates an ingress port to switch core granted payload segment message format;

DETAILED DESCRIPTION

Figure 3:
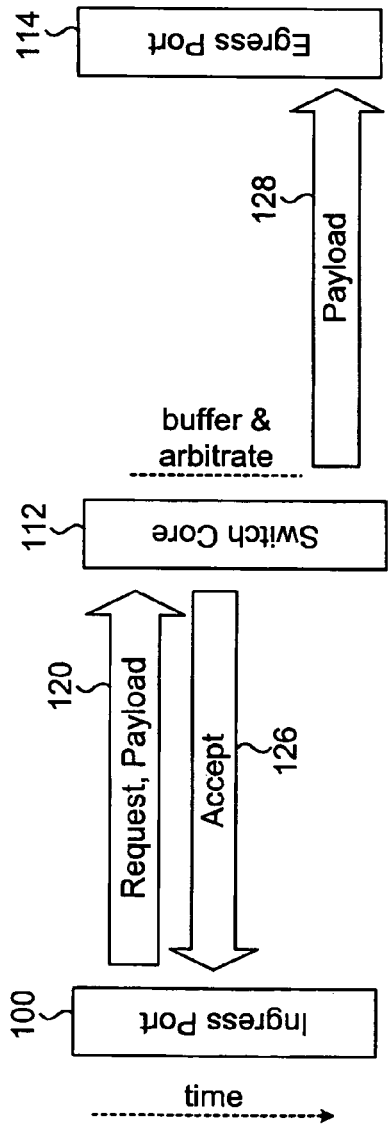
FIG. 3 is a buffering message/time diagram.

Generally, the present invention provides a method and system for opportunistic request-grant switching. If an ingress has no granted payload segment to send, and a flow exists which requires a request to be sent, an opportunistic payload segment is sent including a request and a payload segment related to the request. If an opportunistic payload segment is sent and the payload is dropped, the request is kept and is then treated as a regular request-grant request. The ingress port consequently only has to transmit the payload a maximum of twice. Ingress ports can thus opportunistically exploit the low latency available when egress ports are not contended for, and yet fall back on the strong fairness and quality of service (QoS) assurances of request-grant semantics. Buffering in the switch core can optionally be implemented to extend performance gains, but fairness and QoS are not dependent on this buffering.

The term "bid" as used herein represents any type of switching request that can be sent from an ingress port. Although in this description the term "bid" primarily covers either a request-grant request, or an opportunistic payload segment, it is to be understood that similar types can also be included. Any reference to the term "request-grant request" or "opportunistic payload segment" is to be understood as an example of a bid, or bid for service. An "opportunistic payload segment" is a bid that includes a request and a payload, with the payload being related to the accompanying request. A bid can alternatively include a request and an unrelated granted payload segment. The terms "protocol exchange batches", or simply "batches", are used herein to represent the 'batched' exchanges between port and switch, with each batch being typically conducted in the same time cycle. The exchanges can be (and usually are) two-way, i.e. duplex, exchanges.

The following variable names are also used throughout this specification:

I is always the number of the port from which a message arrived at the switch core, and is also referred to as an origin ingress port. Messages are also sent to port I (e.g., Grants and Drops).

E is always the number of the port for which some message segment is intended, and is also referred to as a destination egress port. Eventually, each message segment gets sent to E.

C is the class of the message segment.

S is the sequence number which is carried in a Grant or Payload message. A switch assigns the same sequence number to all packets intended to be transmitted, e.g. to a crossbar, at the same time (or in the same time slot).

P is the payload contents of the message segments.

B is some buffer in the switch core. Although reference to buffers in the description may imply reference traditional static memory buffers, such a buffer can include any means that can retain electrical, optical, or other information for further transmission.

As mentioned previously, it is desirable that switch fabrics: 1) Enforce QoS constraints; 2) Fairly allocate ingress and egress bandwidth; 3) Avoid the centralized design hotspot associated with full packet buffering in the switch core; and 4) Achieve minimal latency in the transmission of payload segments. In the discussion in the background and in relation to FIG. 1 regarding the request-grant approach and switch interface semantics, the first three objectives can be accomplished (with the use of an appropriate central arbiter). However, the solution according to the request-grant approach is accomplished only at the cost of increasing the latency of payload segment transmission through the switch core. It would be highly desirable to retain the benefits of (1-3), while keeping minimal latency (4). This is the objective accomplished by the innovative portions of this patent application.

It is important to recall that the low latency requirement applies only when the ingress and egress ports are otherwise idle. When ingress or egress is otherwise busy with useful traffic, the latency requirement does not apply. Thus latency need not be considered for flows for which the egress is otherwise busy.

While a standard request-grant protocol is known, and a standard opportunistic and drop protocol is known, embodiments of the present invention combine the advantages of the two into an opportunistic request-grant protocol.

In the following three sections, certain improvements to request grant semantics will be described according to embodiments of the present invention, in the context of the addition of opportunistic low latency features to standard request-grant semantics. These features are opportunistic in the sense that they offer reduced latency when possible. When this opportunistic attempt at low latency fails (due to contention for ports in the switch core), the request falls back in a series of steps to conventional request-grant semantics. Fair enforcement of QoS rules are uniformly applied, even in the presence of these opportunistic features. The three improvements to be discussed are: cut-through behaviour; buffering behaviour; and drop-then-grant behaviour.

Cut-Through Behaviour

The first added behaviour is an opportunistic attempt at cut-through delivery of the payload segment. In cut-through delivery, the payload segment is immediately sent to the switch core by the ingress port. If the desired egress port is idle, the payload segment is immediately routed to that egress. Ideally this cut-through begins as soon as the payload segment has begun to arrive in the ingress port, but cut-through may be delayed until the entire payload segment has arrived in the ingress port. The advantage of waiting is that a trailing redundancy check can be made before forwarding the segment; the disadvantages are increased latency and the fact that the egress port must be reserved while idle waiting for the segment arrival.

It is worth noting that in the previous paragraph, cut-through is discussed with respect to request-grant semantics (i.e. do we 'cut through' the normal request-grant protocol and latency?). The normal meaning of 'cut through' is whether a segment is fully buffered in the switch before being dispatched out an egress port. As discussed above, a 'request-grant cut-through' according to an embodiment of the present invention can be used with or without the conventional meaning of 'cut-through'.

In order to permit compatibility with standard request-grant semantics, the payload segment is transmitted to the switch core with an accompanying or embedded request control segment for the same payload. The request, in this case, may be a single bit in the payload segment header, or a special message type value at the start of the payload segment. Thus a request is being made, but the associated payload segment is being opportunistically sent by the ingress port.

FIG. 2 is a cut-through message/time diagram illustrating the cut-through behaviour in the case that the requested egress port is available. In flow step 120, the ingress port 100 transmits a request and the associated payload segment to the switch core 112. The switch core 112 decides whether the requested egress port is available. Of course, it is possible that multiple ingress ports attempt to cut through to the same egress port at the same time, so the implementation should preferably manage this potential contention. If it is, the cut-through operation proceeds with step 122, otherwise a behaviour to be described later takes over. In step 122, the switch core 112 cuts the arriving payload segment through to the requested output port, or egress port 114. In step 124, the switch core 112 forwards an Accept message to the ingress port 100. This accept message has the meaning: 'I've accepted your opportunistically submitted payload segment'.

It is worth noting in describing this embodiment of the present invention that different reference numerals have been used for the ingress port 100, the switch core 112, and the egress port 114, as opposed to the numerals used when describing the prior art. Although similar elements as those in the prior art could be used, in particular with respect to the egress port, the ingress port and the switch core will preferably have access to control logic that permits them to implement method steps according to embodiments of the present invention, as will be described later.

The primary benefits of this scheme including the cut-through behaviour are:

1) The addition of a mechanism which supports opportunistic, minimal latency, cut-through switching. This has twin performance benefits:
    a. latency is minimized, when possible, and
    b. unused egress bandwidth is utilized more quickly, thereby becoming available for later requests more quickly.

2) As will be shown, this mechanism can be seamlessly integrated with several other behaviours, which reduce to standard request-grant semantics in the worst case.

Buffering Behaviour

As has been discussed, the requirement to provide full buffering for all flows in a switch (to support full, fair QoS) is expensive, and limits the size of practical switch cores. Switches which rely entirely on buffering in the switch core either compromise QoS, fairness, or port count.

However, when the integrity of fair QoS is supported by a mechanism such as request-grant semantics (and an appropriate arbiter), it is possible to make use of less than full buffering per flow to obtain some opportunistic performance gains. This section describes such a mechanism. It is assumed that the switch core does have some limited number of buffers in which it can store payload segments waiting for transmission to some presently busy egress port.

The behaviour described in this section is a continuation of the cut-through behaviour described in the previous section. Recall that cut-through behaviour was available only when the egress port was otherwise idle. This section considers the first response when an opportunistic cut-through attempt fails because the egress port is otherwise busy.

If the switch core has an available buffer, it places the opportunistically submitted payload segment in that buffer, and begins to arbitrate on behalf of that payload segment for access to the desired egress port. This process is detailed in FIG. 3, which illustrates a buffering message/time diagram. In step 120, the ingress port 110 transmits a request and the associated payload segment to the switch core 112. The switch core 112 discovers that the requested egress port is not available. The switch core then checks to see if a buffer is available to store the opportunistically submitted payload segment. If it is, the cut-through operation proceeds with step 126, otherwise a behaviour to be described later takes over. The opportunistically submitted payload segment is stored in the available buffer and, in step 126, an Accept is immediately transmitted to the ingress port 110. This Accept tells the ingress port that its opportunistically submitted payload segment has been accepted. The switch core begins to arbitrate on behalf of the buffered payload segment. When the buffered payload segment wins its required output port in the arbitration process, it is forwarded, as shown in step 128, to that output port from the buffer which contains it. After complete transmission, the buffer is returned to the free pool for reuse.

Buffering has the performance advantage of avoiding the re-transmission of payload segments which were opportunistically submitted for cut-through, but encountered busy egress ports. Thus buffering does not provide an independent performance gain in this system, but has an important role in combination with the other behaviours.

Drop-then-Grant Behaviour

Drop-then-grant semantics are the continuation behaviour which is followed when a cut-through attempt has failed, and the payload segment cannot be buffered due to a lack of available buffers in the switch core.

In this case, the egress port is busy and there is no buffer to hold the arriving payload segment. The switch core has no alternative but to drop the segment. The switch core then informs the ingress port of this action, and treats the opportunistic payload request as a conventional Request in standard request-grant semantics. The behaviour of the switch core and the ingress port then follow the standard request-grant behaviour.

Figure 4:
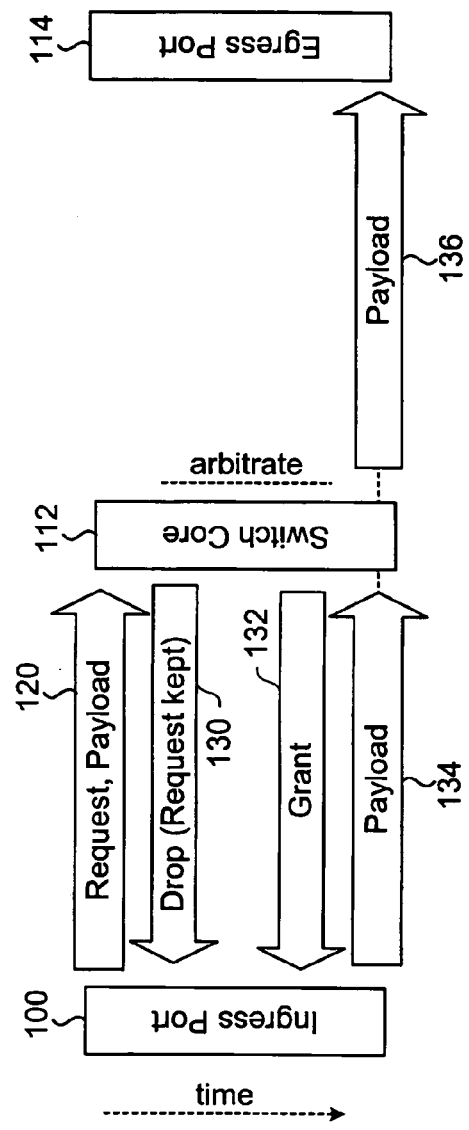
FIG. 4 is a drop-then-grant message/time diagram.

This process is detailed in FIG. 4, which illustrates a drop-then-grant message/time diagram. In step 120, the ingress port 110 transmits an opportunistic payload segment to the switch core 112. The switch core 112 discovers that the requested egress port is not available. The switch core also discovers that no buffer is available to store the segment. In step 130, the segment is dropped and the Request is honoured (kept, or recorded, at the switch) by increasing the request count for the appropriate flow. That count then begins to participate in switch core arbitration attempts. As part of step 130, the ingress port 110 is informed by a Drop message from the switch core 112. Eventually, the request recorded in step 130 wins access to the required egress port. At that time, as part of step 132, a Grant is sent to the ingress port. The ingress port 110 responds to the Grant in step 134 by forwarding the payload segment (which had been opportunistically submitted and dropped, earlier). In step 136, the switch core 112 cuts the arriving payload segment through to the required egress port 114.

The advantage of this behaviour is that it provides a base case which integrates the opportunistic behaviours (cut-through and buffer) with the standard request-grant behaviour.

An Integrated View of the Four Behaviours

According to embodiments of the present invention, standard request-grant behaviour has been supplemented with two opportunistic behaviours (cut-through and buffering), as well as one fall-back behaviour (drop-then-grant) which integrates all the behaviours into the standard request-grant behaviour.

Consider the following points:

1) Cut-through behaviour cannot compromise fairness and QoS because cut-through takes place only when the egress is otherwise idle. When the egress is otherwise idle, any payload of any flow is the arbitration winner.

2) Buffering behaviour provides no unfair advantage to the buffered payload segment. It is, by definition, competing for a presently busy egress port. The fact that the payload segment is buffered in the switch core instead of in the ingress port offers no advantage whatsoever with respect to the arbitration process. So fairness and QoS enforcement are not compromised in this case either.

3) Drop-then-grant behaviour is indistinguishable from standard request-grant behaviour in the sense that the payload segment must compete for access to the desired egress port in the standard request-grant method. Thus fairness and QoS are preserved.

The above points support the argument that these added behaviours can not compromise the fairness and QoS enforcement policies of the arbiter. It is important to notice that fairness and QoS enforcement are entirely independent of the state of allocation of any buffers provided in the switch core.

A significant point does remain: in the drop-then-grant case, a payload segment has been transmitted to the switch core from its ingress port twice. This represents wasted bandwidth and lost ingress opportunity—some other payload segment or request could have been transmitted during this wasted time. This represents a performance loss of this system.

However, there are several reasons why this overall fabric protocol, with its drop-then-grant behaviour, is a net performance gain:

1) The two opportunistic behaviours (cut-through and buffer) offer performance gains which can be expected to be greater than performance losses due to drop-then-grant behaviour. In particular, the most important case to optimize for many applications is the simple cut-through (when the desired egress is usually idle, but QoS and fairness must be enforced when it is not idle). The invention clearly gains all opportunities for cut-through performance. When egresses are under contention, congestion must back up into the ingress ports. The optional use of core fabric buffering merely extends those ingress port buffers into the fabric, without compromising fairness or QoS. The gain obtained from these core buffers occurs during periods of light, intermittent egress congestion, which is also common in many applications.

2) Ingress ports can learn from drop-then-grant disappointments (indicated by the receipt of a Drop control segment). They can respond by avoiding opportunistic segment submissions to that egress port (or to any port) for some modest period of time. Such information can be stored, for example, in a table that can be consulted when the ingress port decides whether to send a submission opportunistically or by regular request-grant transmission. The motivation for this lies in the fact that the switch core is congested to the extent that its opportunistic buffers are full, and further opportunistic submissions cannot be expected to provide any gain. After some period of hold-off of opportunistic submissions, the ingress port should probe the switch core by attempting further opportunistic submissions.

Embodiments of the present invention can be considered in terms of methods or systems. In considering such methods and systems, it is beneficial to consider the following relevant concepts. A regular time cycle is typically shared by a switch core and all the ingress and egress ports. This time cycle is just long enough for the transmission of one payload segment and possible control information such as Requests and Grants. All the ports and the switch are preferably coordinated in this cycle so the switch can issue Grants and know that the corresponding payload segments will all arrive at (nearly) the same time, so it can set up its internal switching paths to accommodate this 'batch' of payload segments. The terms "protocol exchange batches", or simply "batches", are used herein to represent the 'batched' exchanges between port and switch.

Figure 5:
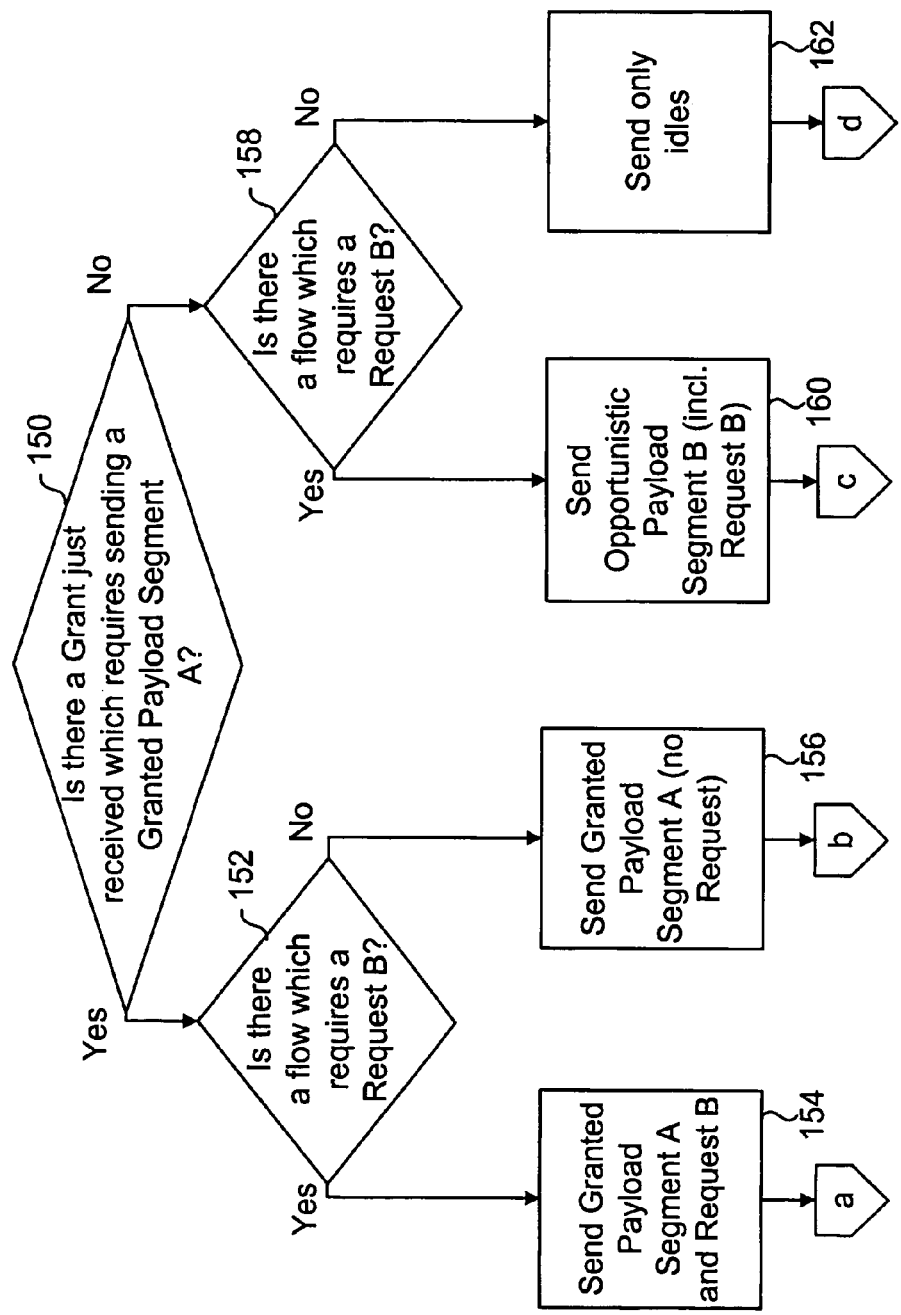
FIG. 5 is a flowchart illustrating a method according to an embodiment of the present invention from an ingress logic message sending point of view.

FIG. 5 is a flowchart illustrating a method according to an embodiment of the present invention from an ingress logic message sending point of view. Remembering the discussion above, each ingress port preferably "lives" in a regular time cycle. For any time cycle, it either has or has not be given a Grant (in the previous batched time cycle). If it has been given a Grant, it must submit the corresponding payload segment. If it has not been given a Grant, it has nothing it must submit and might as well submit an opportunistic payload segment, as it will otherwise waste the bandwidth to the switch. If this succeeds, a payload segment has been snuck into and through the switch without suffering the Request/Grant latency. If this fails: the Request has been received at the switch (recall the switch takes a failed Opportunistic attempt as a Request), and didn't waste otherwise useful bandwidth in transporting the payload segment.

Consider now the particular steps shown in the flowchart of FIG. 5. In step 150, a determination is made as to whether a Grant has been received, for example in a previous batched time cycle, which requires sending a Granted Payload Segment for flow A. If such a Grant has been received, the method proceeds to step 152, in which it is determined whether there is a flow B which requires a Request to be sent to the switch core. In this case, a Request for flow B is used to represent a request that is unrelated to the Granted Payload Segment for flow A. The Granted Payload Segment for flow A would itself be related to a previous Request for flow A or to an Opportunistic Payload Segment for flow A, from which the Request for flow A portion was kept at the switch core. If there is a flow B which requires a Request, the method proceeds to step 154 in which the Granted Payload Segment for flow A and the Request for flow B are both sent in the same time cycle. If there is no flow B which requires a Request, the method proceeds to step 156 in which the Granted Payload Segment for flow A is sent, and no Request is sent.

If a Grant has not been received in the previous batched time cycle, the method proceeds to step 158, which makes a similar determination as step 152. If there is a flow B which requires a Request, then an Opportunistic Payload Segment for flow B is sent, including the Request B and a payload segment related to the Request B. If there is no flow B which requires a Request, since there is also no Granted Payload Segment awaiting transmission, the method proceeds to step 162, in which idle messages are sent. Connection points a, b, c and d are shown in both FIG. 5 and FIG. 6 to illustrate a connection between the steps of the methods shown in the two figures.

Figure 6:
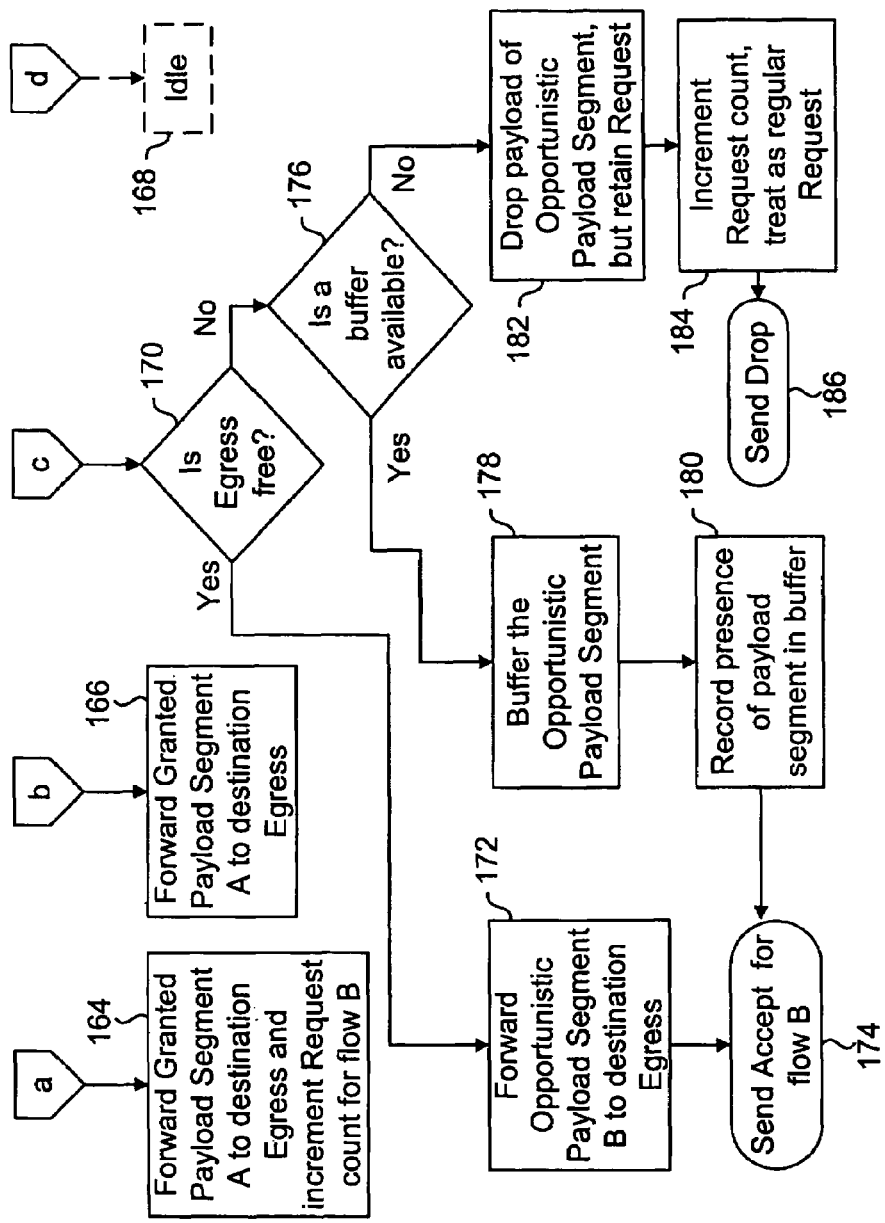
FIG. 6 is a flowchart illustrating a method according to an embodiment of the present invention from a switch core point of view.

FIG. 6 is a flowchart illustrating a method according to an embodiment of the present invention from a switch core point of view. In response to receipt of a Granted Payload Segment A and an unrelated Request B (such as sent in step 154 of FIG. 5), the switch core then proceeds to step 164. In step 164, the switch core forwards the Granted Payload Segment for flow A to a destination egress port and increments a Request count for flow B. The destination egress port would have been specified in the previously received Request for flow A, and the Request for flow B count is a count relating to the parameters (I, E, C), as defined earlier. In response to receipt of a Granted Payload Segment for flow A (such as sent in step 156 of FIG. 5), with no accompanying request, the switch core then proceeds to step 166. In step 166, the switch core forwards the Granted Payload Segment for flow A to a destination egress port. In both steps 164 and 166, the step of forwarding the granted payload segment can include: checking the payload segment, optionally aligning the payload segment to a start of a payload segment permutation group (such as a batch); and forwarding the payload segment to a crossbar. In response to receipt of an Idle message (such as sent in step 162 of FIG. 5), the switch core remains idle and takes no action, as shown in step 168.

Steps 170-186 of FIG. 6 describe the possible steps taken at the switch core in response to receipt of an opportunistic payload segment is received, such as sent in step 160 of FIG. 5. In step 170, a determination is made as to whether the destination Egress is free. This destination egress is specified in the Request portion of the opportunistic payload segment. If the destination egress is available, the method proceeds to step 172, in which the opportunistic payload segment for flow B is sent to the destination egress. Following that, the switch core, in step 174, sends an Accept for flow B to the egress associated with the origin ingress port (i.e. the ingress port from which the opportunistic payload segment was sent).

If the destination egress is not free, or is unavailable, a determination is made in step 176 as to whether a buffer at the switch core is available. If a buffer is available, or free, the method proceeds to step 178, in which the opportunistic payload segment for flow B is retained or stored in the available buffer. In step 180, the switch core then records the presence of the payload segment in the buffer, and the method proceeds to step 174 in which an Accept message is sent to the egress associated with the origin ingress port. If a buffer is not available, in step 182 the payload portion of the opportunistic payload segment is dropped, but the request for flow B portion is retained at the switch core. In step 184, the request count for flow B, such as the count relating to the parameters (I, E, C), is then incremented, and the request is treated as a regular request-grant request. Following that, in step 186, a Drop for flow B is sent to the egress associated with the originating ingress port.

Describing the method in other words, the present invention provides a method of opportunistic request-grant switching in a switch having ingress ports, a switch core, and egress ports. The method includes the following steps: receiving a bid at the switch core, the bid having a request and a related payload; dropping the related payload in response to a determination of unavailability of a destination egress port; and retaining the request at the switch core for treatment as a request-grant request.

In some embodiments, the determination of unavailability of the destination egress port can include a determination of unavailability of a free buffer at the switch core. The step of dropping the related payload can include notifying an egress to send a drop, the egress being associated with an originating ingress port. The method can further comprise storing the related payload in a free buffer in response to a determination of availability of the free buffer, and optionally marking the payload as cut-through and incrementing a flow count for a flow associated with the request. The treatment as the request-grant request can include: receiving a granted payload segment from an origin ingress port upon granting of the request-grant request; and forwarding the granted payload segment from the switch core to the destination egress port. The method can further include forwarding the related payload to the destination egress port as a cut-through in response to a determination of the availability of the destination egress port, and optionally sending an accept message to an egress associated with an origin ingress port.

Of course, the method described above can be implemented in software. Accordingly, in a yet further aspect, the present invention provides a computer-readable storage medium including statements and instructions which, when executed, cause a computer to perform the steps of: receiving a bid at a switch core, the bid having a request and a related payload; dropping the related payload in response to a determination of unavailability of a destination egress port; and retaining the request at the switch core for treatment as a request-grant request.

In a further aspect, the present invention provides a computer data signal embodied in a carrier wave, comprising computer instructions for: receiving a bid at a switch core, the bid having a request and a related payload; dropping the related payload in response to a determination of unavailability of a destination egress port; and retaining the request at the switch core for treatment as a request-grant request.

Embodiments of the present invention can also be described in relation to a system or device, such as a switch core itself. Accordingly, in a further aspect, there is provided a switch core for opportunistic request-grant switching, the switch core being in communication with ingress ports and egress ports. The switch core includes: a receiver for receiving a bid at the switch core, the bid having a request and a related payload; payload management means for dropping the related payload in response to a determination of unavailability of a destination egress port; and storage means for retaining the related request at the switch core for treatment as a request-grant request.

In some embodiments, the payload management means of the switch core can include means for dropping the related payload in response to a determination of unavailability of a free buffer at the switch core. The payload management means can include notification means for notifying an egress to send a drop, the egress being associated with an originating ingress port. The switch core can further include: a buffer for retaining the related payload; and a buffer availability indicator for indicating an availability of the buffer. The switch core can further include transmit means for forwarding the related payload to the destination egress port as a cut-through in response to a determination of availability of the destination egress port, and the transmit means can include means for sending an accept message to an egress associated with an origin ingress port. The switch core can further include: means for receiving a granted payload segment from an origin ingress port upon granting of the request-grant request; and means for forwarding the granted payload segment from the switch core to the destination egress port.

Figure 7:
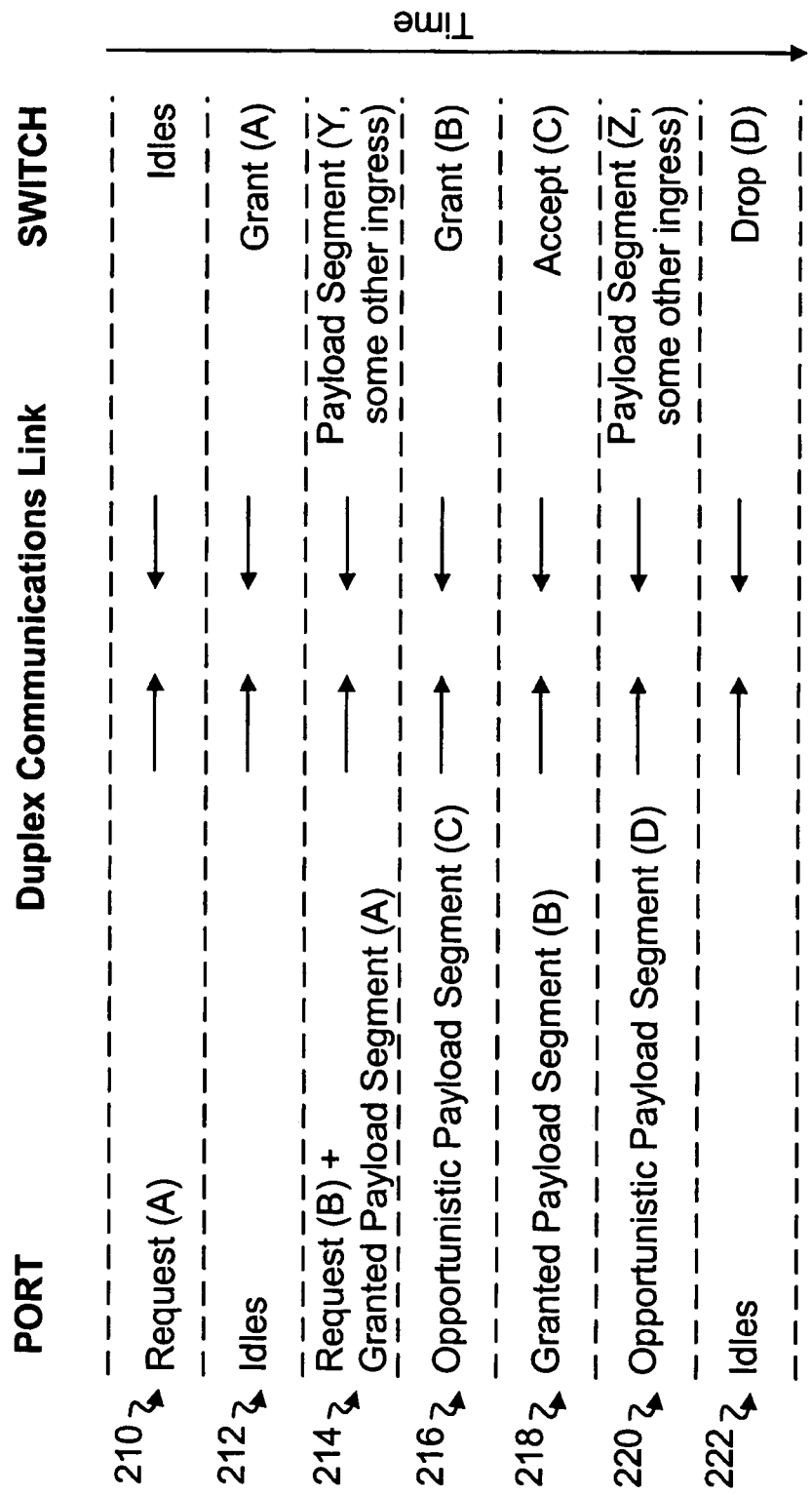
FIG. 7 illustrates an example of communications between an ingress port and a switch core.

FIG. 7 illustrates an example of communications between an ingress port and a switch core. While methods have been described in relation to FIG. 5 and FIG. 6 in terms of a perspective of a particular flow from the point of view of the ingress port or the switch core, FIG. 7 illustrates an example of a series of communications between a port and a switch. As described earlier, in every batched cycle between ports and the switch, both the ports and the switch have an opportunity to send both a payload segment and control information (including Requests, Grants, Accepts, and Drops). The full exchange is two duplex paths: on one the switch is sending Payload Segments and/or Grants to the port; on the other, the port is sending Payload Segments (Granted or Opportunistic) and/or control information (Requests) to the switch. In the example of FIG. 7, the port is shown on the left and the switch on the right, with the temporal batches separated by dotted horizontal lines, and with the timeline progressing from top to bottom.

In time cycle 210, the port sends a Request (A) (i.e., a Request for flow A) to the switch, while the switch is sending idle messages. The Request (A) is sent alone because there are no granted payload segments to be sent in response to an immediately preceding grant, and that for some reason the ingress is not free to accept an opportunistic submission (e.g. there are no payload segments related to Request (A) that are ready to be sent opportunistically). In time cycle 212, the port is sending idle messages, since there are no payloads and no requests to be sent. During the same time cycle 212, the switch is sending a Grant (A) message, in response to the Request (A) message sent from the port in time cycle 210. In time cycle 214, a Request (B) message is sent along with Granted Payload Segment (A), while the switch is sending a Payload Segment (Y) to an ingress other than the one doing the sending in time cycle 214. In time cycle 216, the port sends an Opportunistic Payload Segment (C), while the switch sends a Grant (B) message in response to the Request (B) message sent in time cycle 214. In time cycle 218, the port sends Granted Payload Segment (B) in response to the recently received Grant (B) message, while the switch sends an Accept (C) message to the port, indicating that the Opportunistic Payload Segment (C) was accepted. In time cycle 220, the port sends Opportunistic Payload Segment (D) to the switch, while the switch is sending a Payload Segment (Z) from an ingress other than the one doing the sending in time cycle 220. In time cycle 222, the port is sending idles since it has no Requests or Granted Payload Segments to send, while the switch is sending a Drop (D) message, indicating that the payload of the Opportunistic Payload Segment (D) was dropped, but that the request portion of the Opportunistic Payload Segment (D) has been retained.

Considering the subject matter of FIG. 5 and FIG. 7, embodiments of the present invention can be described in relation to an ingress device, or an ingress port. Accordingly, in another aspect, there is provided an ingress device for communicating with a switch core in a data switch. The ingress device includes: determining means for determining that a bid to be sent is to include a request and a related payload; send means for sending the bid to the switch core; and payload management means for holding a copy of the related payload for retransmission pending receipt of a grant message.

In some embodiments, the determining means of the ingress device can include means for determining that the bid to be sent is to include the request and the related payload in response to a determination in an immediately preceding time cycle that no grant has been received which requires sending a granted payload segment. The payload management means of the ingress device can include means for discarding the copy of the payload in response to receipt of an accept message from the switch core. The payload management means can include means for sending the copy of the payload to the switch core with a sequence number in response to receipt of the grant message. The ingress device can further include a message type identifying means, for identifying a message type associated with a received message.

Figure 8:
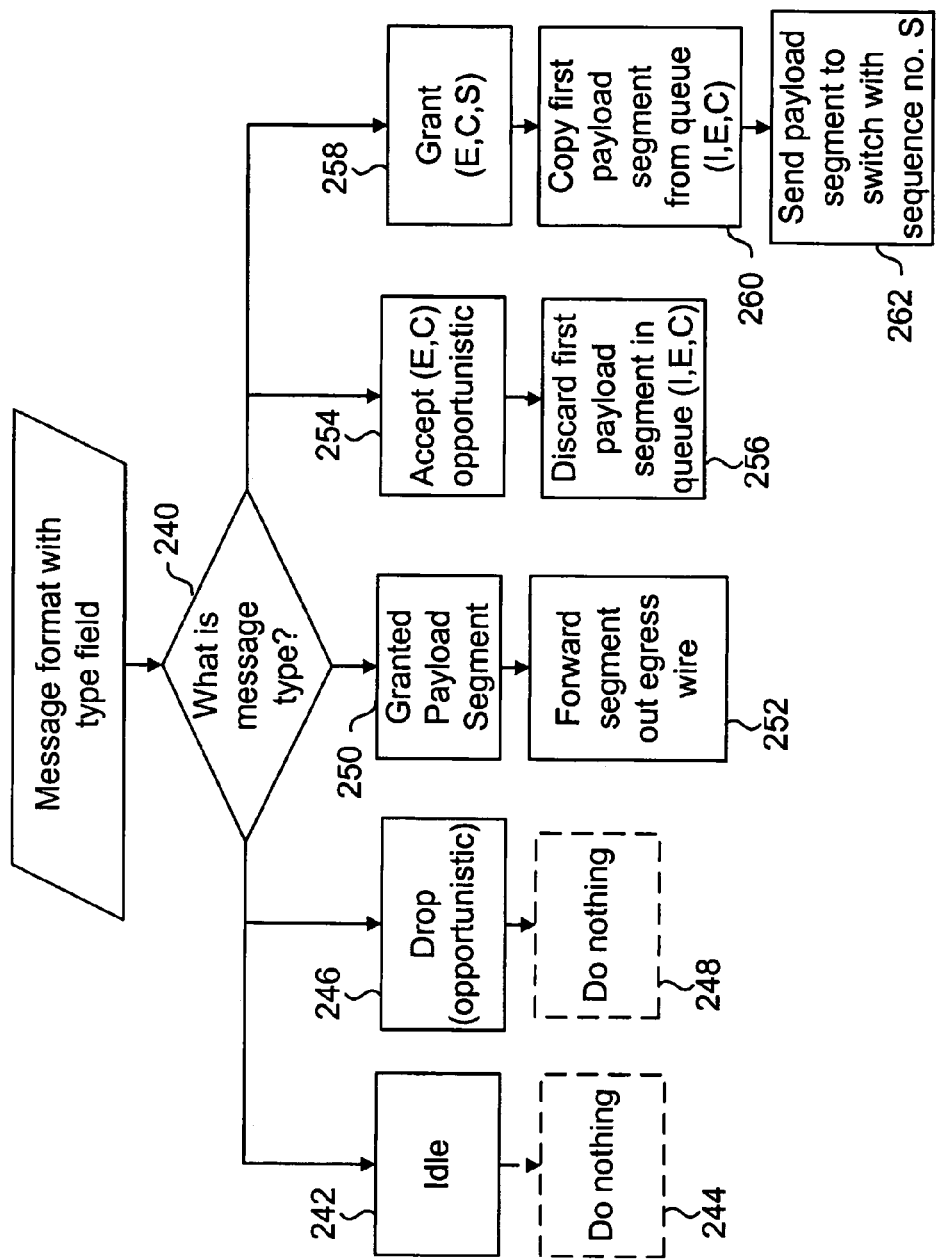
FIG. 8 is a flowchart illustrating a method according to an embodiment of the present invention from an ingress port message receiving point of view.

FIG. 8 is a flowchart illustrating a method according to an embodiment of the present invention from a port behaviour point of view. In other words, this flowchart illustrates a method, or ingress logic behaviour, relating to the ingress port when it has a function of receiving messages from the switch core. Step 240 illustrates the determination of the message type received at the ingress port from the switch core. This determination is typically based on a message type field in the message itself, which will be described later. If it is determined, as in step 242, that the message is an idle message, the ingress port does nothing (step 244). If it is determined that the message is a drop message from an opportunistic attempt (as in step 246), the ingress port also does nothing (step 248). If it is determined, as in step 250, that the message is a granted payload segment, the segment is forwarded out an egress wire, as in step 252, the egress wire preferably corresponding to the ingress port. As explained previously, each port has an ingress role and an egress role: in the egress (from switch to port), the port can receive a Grant; in the ingress (port to switch) path, the port forwards a payload segment in response (and perhaps a Grant in the same "batch"). If it is determined that the message is an Accept message for an opportunistic transmission (for Egress E at class C), as in step 254, the method proceeds to step 256, where the first payload segment in the queue (I, E, C) is discarded (during the payload segment which was just accepted). If it is determined, as in step 258, that the message is a grant message having the parameters (E, P, S), then in step 260 the first payload segment is copied from queue (I, E, C), and in step 262 the payload segment is sent with a segment number S to the switch.

Of course, the subject matter of FIG. 8 can also be described in relation to a device, or physical implementation. In other words, in an aspect, the present invention provides an ingress device for communicating with a switch core in a data switch. The ingress device includes: determining means for determining that a bid to be sent is to include a request and a payload; send means for sending the bid to the switch core; and payload management means for holding a copy of the payload for retransmission pending receipt of a grant message.

In some embodiments, the payload management means can include means for discarding the copy of the payload in response to receipt of an accept message from the switch core. The payload management means can include means for sending the copy of the payload to the switch core with a sequence number in response to receipt of the grant message. The ingress device can further include a message type identifier, or message type identifying means, for identifying a message type associated with a received message.

The behaviour of embodiments of the invention will now be presented as the responses of the ingress port and the switch core to the various messages. The behaviour of the egress port would simply be a traditional egress port behaviour, substantially unaffected by embodiments of the present invention, and would therefore be obvious to one of ordinary skill in the art.

In the description below, the behaviours will generally be discussed as methods or in a 'software style', but are expected to be implemented in hardware in the preferred embodiment. Of course, embodiments of the present invention can be implemented in any one of software and/or hardware or any combination thereof; as statements or instructions stored on a computer-readable medium for performing certain method steps when executed by a computer; and as a signal embodied in a carrier wave including data segments and/or instructions for performing certain method steps when executed by a computer.

The format of the messages exchanged by the ingress port, the switch core, and the egress port are described below in relation to FIGS. 8-15. Different fields are represented by different reference numerals. Similar fields in each message are assigned similar reference numerals, so that the similarity between the fields in the messages can be observed. The similar fields can be the same for each of the different message types (though their contents will obviously differ), but they could also be somewhat different from each other, which is why different but parallel reference numerals are used. Although particular field lengths are indicated in the figures, these are only examples and any suitable field lengths could be alternatively used.

A request message format 320 is illustrated in FIG. 9. Message type, or Msg Type, field 322 is a control field which indicates the start of a request message. Egress port field 324 includes the address (0 . . . N−1) of an egress port to which a payload segment is to be sent. Class field 326 indicates a priority class of the payload segment. Field 328 is not so much a field as a group of unused bits in this message format. ECC field 330 includes an error detection/correction code for the contents of the request message. The combination of the port of origin of the request (I), and the egress port (E) and class (C) fields of the request indicate the switching flow (<I, E, C>). The request message format could optionally include a sequence number field, including a request sequence number, which would provide for more robust scheduling, and would be used in a similar manner to other sequence numbers, as described herein.

A grant message format 340 is illustrated in FIG. 10. Message type, or Msg Type, field 342 is a control field which indicates the start of a grant message. Egress port field 344 includes the address (0 . . . N−1) of an egress port to which a payload segment is to be sent. Class field 346 indicates a priority class of the payload segment. Sequence Number, or Seq. Num., field 352 includes a unique identifier (e.g. a grant sequence number) passed to an ingress port, to be inserted in the corresponding payload segment header to establish the correspondence between the grant and the arriving payload segment. ECC field 350 includes an error detection/correction code for the contents of the grant message. The combination of the port of destination of the grant (I), and the egress port of the request (E) and class (C) fields of the request indicate the switching flow (<I, E, C>).

FIG. 11 illustrates an ingress port to switch core granted payload segment message format 360. Message type, or Msg Type, field 362 is a control field which indicates the start of a payload segment on the ingress port to switch core path, also referred to as an ingress port to switch core granted payload segment. Field 368 is not so much a field as a group of unused bits in this message format. Sequence Number, or Seq. Num., field 372 includes a unique identifier (e.g. a granted payload sequence number) passed to an ingress port in the grant, being returned in the corresponding payload segment header to establish the correspondence between the grant and the payload segment. Payload field 374 includes the payload segment itself of, for example 64 bytes, or of any desired length(s). ECC field 370 includes an error detection/correction code for the contents of the payload segment. The ingress port (I) is determined by the port of arrival. The message carries a sequence number (S) which is used to look up the associated egress port (E) and message class (C), thereby determining the switching flow (<I, E, C>).

Figure 12:
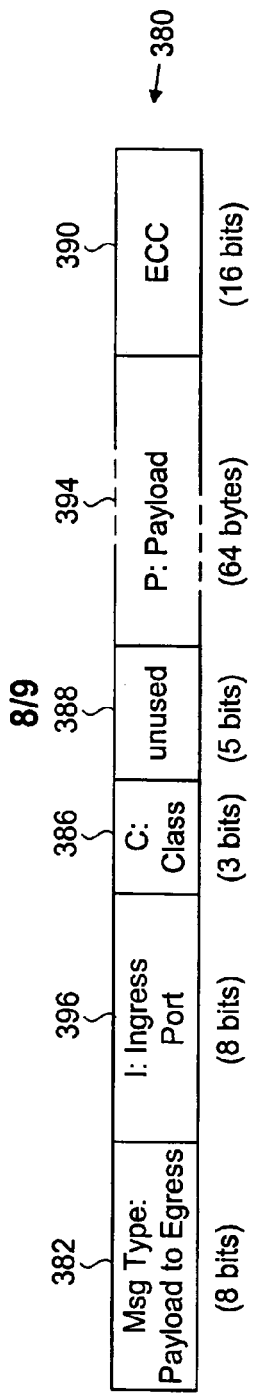
FIG. 12 illustrates a switch core to egress port payload segment message format.

FIG. 12 illustrates a switch core to egress port payload segment message format 380. Message type, or Msg Type, field 382 is a control field which indicates the start of a payload segment on the switch core to egress port path, also referred to as a switch core to egress port payload segment. Ingress port field 396 includes the address (0 . . . N−1) of an ingress port from which a payload segment is being sent. Class field 386 indicates a priority class of the payload segment. Field 388 is not so much a field as a group of unused bits in this message format. Payload field 394 includes the payload segment itself of, for example, 64 bytes or of any desired length(s). ECC field 390 includes an error detection/correction code for the contents of the payload segment. The combination of the port of destination of the payload segment (E), and the ingress port of the request (I) and class (C) fields of the payload segment indicate the switching flow (<I, E, C>).

Figure 13:
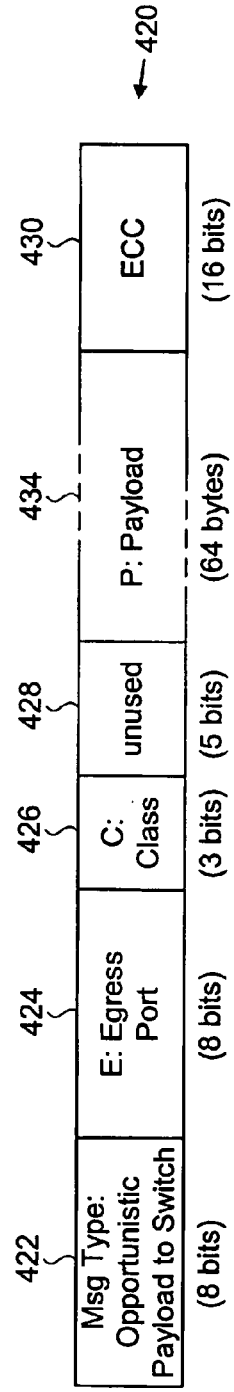
FIG. 13 illustrates an ingress port to switch core opportunistic payload segment message format.

FIG. 13 illustrates an ingress port to switch core opportunistic payload segment message format 420. Message type, or Msg Type, field 422 is a control field which indicates the start of an opportunistic payload segment on the ingress port to switch core path, also referred to as an ingress port to switch core opportunistic payload segment. Egress port field 424 includes the address (0 . . . N−1) of an egress port to which an opportunistic segment is to be sent. Class field 426 indicates a priority class of the payload segment. Field 428 is not so much a field as a group of unused bits in this message format. Payload field 434 is the payload segment itself of, for example, 64 bytes or of any desired length(s). ECC field 430 is an error detection/correction code for the contents of the payload segment. The combination of the port of arrival of the payload segment (I), and the egress port (E) and class (C) fields of the payload segment indicate the switching flow (<I, E, C>).

Figure 14:
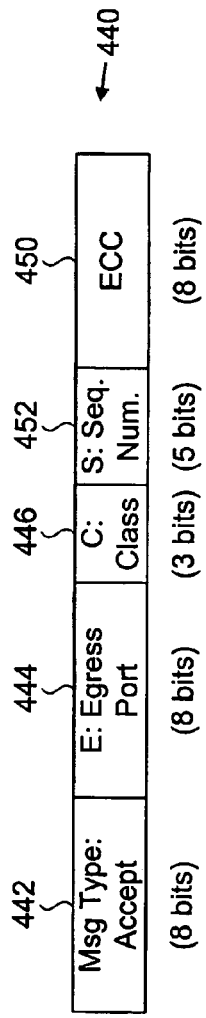
FIG. 14 illustrates an accept message format.

An accept message format 440 is illustrated in FIG. 14. Message type, or Msg Type, field 442 is a control field which indicates the start of an accept message. The accept message format of FIG. 14 is identical to the grant message format of FIG. 10, except for the message type field. Therefore, the descriptions of fields 444, 446, 452 and 450 in FIG. 14 are similar to fields 344, 346, 352 and 350 in FIG. 10, and the reader can refer to the earlier discussion thereof. In the case of 452, this could be referred to as an accept sequence number, which would be a different set of numbers than the grant sequence number.

Figure 15:
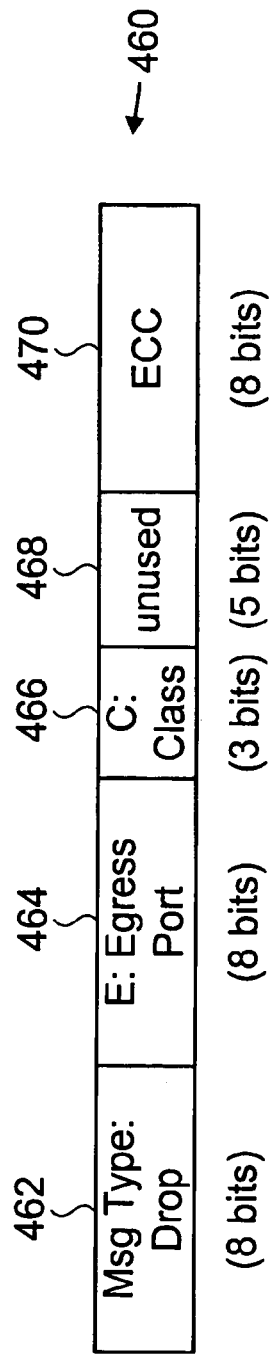
FIG. 15 illustrates a drop message format.

A drop message format 460 is illustrated in FIG. 15. Message type, or Msg Type, field 462 is a control field which indicates the start of a drop message. Egress port field 46 includes the address (0 . . . N−1) of an egress port to which a payload segment is to be sent. Class field 466 indicates a priority class of the payload segment. Field 468 is not so much a field as a group of unused bits in this message format. ECC field 470 includes an error detection/correction code for the contents of the drop message. The drop message format of FIG. 15 is similar to the request message format of FIG. 9, except for the difference in the message type field. The combination of the port of destination of the drop (I), and the egress port (E) and class (C) fields of the payload segment indicate the switching flow (<I, E, C>).

Figure 16:
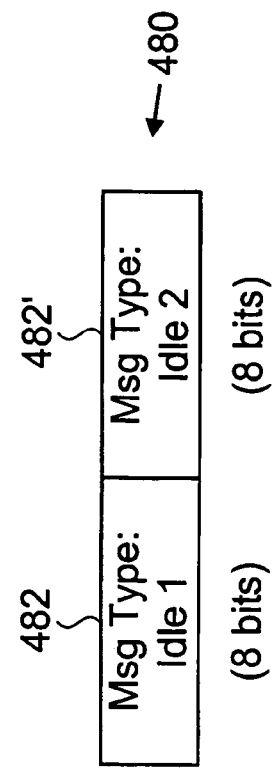
FIG. 16 illustrates an idle message format.

An idle message format 480 is illustrated in FIG. 16. Idles are used to fill otherwise unused link bandwidth. Essentially, the idle message includes two message type, or Msg Type, fields 482 and 482', which are control fields that indicate (and protect) the presence and position of an idle. Message type fields 482 and 482' can be identical to each other, or can include slight variations, such as one indicating the start of an idle message and the other indicating an end of an idle message.

In general, the various payload segments in the message formats described above can advantageously include a request sequence number. In that case, a drop or accept message can make reference to the request sequence number in the payload segment. An accept message does not generally need to include a sequence number, since the ingress port can typically determine the sequence based on the timing of when the last request was sent with the same E and C values.

Switch Core Message Responses

The behaviour of the switch core to the various messages is defined in the sub-sections which follow. There is no semantic response to idle messages. The immediately following sub-section describes the state associated with the switch core and the initialization of these state values.

The following state variables are assumed to exist in the switch core:

ReqCount[I, E, C]: a set of request counts, one per flow. These are indexed by ingress port (I), egress port (E), and class (C). All counts are initially zero.

Buffer[B]: a set of payload segment buffers. Each buffer contains (I, E, C, and P) for one payload segment. These may be shared among ingress ports, or divided into separate pools per ingress port; they may be shared among classes, or divided into separate pools per class. Initially, all buffers are known to be available.

NextSeqNo[I]: the number of the next grant sequence number to be sent to port I. This counter wraps around from maximal positive to zero. The count field must be large enough that all outstanding grants (and their contained sequence numbers) are responded to with the corresponding payload segment (and the same contained sequence number) before this counter wraps around to that same sequence number again.

SeqNoOutstanding[I, S]: for each possible outstanding grant, S, to each ingress port, I, storage for the associated egress port, E, and traffic class, C.

The following paragraphs describe the behaviour of the switch core in various situations, presented in pseudo-code format.

On Receipt of Request with (E, C) from Port I

ReqCount[I, E, C]+=1
   On Occurrence of Arbitration Victory for Flow (I, E, C)

when RequestCount[I, E, C] is associated with an arbitration victory:
   if there is a buffer, B, matching (I, E, C, P) for fixed I, E and C, and any P;
   (if there are multiple such buffers, take the oldest first>
   then {send a previously buffered segment}
   Send Payload-to-Egress(E, C, P)
   RequestCount[I, E, C]-= 1
   Mark buffer B as empty
   else {send a grant for a newly victorious segment}
   send Grant(E, C, S=NextSeqNo) to port I
   SeqNoOutstanding[I, NextSeqNo]:= (E, C)
   NextSeqNo += 1
   RequestCount[I, E, C]-= 1
   On Receipt of Granted Payload Segment with (S, P) from Port I (E, C) := SeqNoOutstanding[S]

Send Payload-to-Egress(E, C, P)
   On Receipt of Opportunistic Payload Segment with (E, C, P) from Port I if egress E is idle then
   Send Payload-to-Egress(I, C, P) to egress E
   Send Accept(E, C) to ingress I else if port I has an available buffer then
   Buffer[B] := (I, E, C, P)
   Send Accept(E, C) to ingress I
   ReqCount[I, E, C] += 1 else
   send Drop(E, C) to port I
   ReqCount[I, E, C] += 1

Ingress Port Message Responses

The behaviour of the switch core to the various messages is defined in the sub-sections which follow. The only state required in the ingress port is the data structure required for the N*C flows to the other ports. Additional information may be added to ensure the extended request-grant protocol continues to operate correctly, but such additions are optional.

The following paragraphs describe the behaviour of the ingress port in various situations, presented in pseudo-code format.

On Availability of a Payload, P, for Flow (I, E, C) optionally:

1: Send Request(E, C), or

2: Send Opportunistic-Payload(E, C, P)
   On Receipt of Grant with (E, C, S)

send Granted-Payload with (S, P)

remove first P from local queue for (E, C)
   On Receipt of Accept with (E, C, S)

remove first P from local queue for (E, C)
   On Receipt of Drop with (E, C)

no action

ALTERNATIVE EMBODIMENTS OF THE INVENTION

Embodiments of the present invention have been primarily defined in terms of messages between ingress/egress ports and the switch core, and the response of these components to these messages. This is a highly general definition, which can be realized in an enormous variety of ways, using the tools of digital systems design and the ordinary skills of implementers.

At least the following features of the preferred embodiment could be varied, and still lie within the scope of this disclosure:

1) The formats of the various message could be varied in any way consistent with the same general information being transported.

2) The messages could be broken into multiple messages, or combined into single larger messages. For instance, a single message to replace the pair of a request and a payload segment could be defined for opportunistic payload segment submissions.

3) The numbers of ingress/egress ports and the number of classes could be varied.

4) The present scheme has been defined only for unicast switching; it could be extended to multicast/broadcast switching with only trivial changes to the invention described here. The most important changes for multicast are a more powerful arbiter (not defined here in any case), and the (potential) ability to satisfy the multiple payload segment emissions of multicast in multiple time steps, thereby requiring that the payload segment be stored in some buffer for later completion of the multicast fanout.

5) The logic of the ports and the switch core could be implemented in a great variety of ways, including but not limited to:

a. custom hardware gates, b. gate arrays, c. FPGAs, d. software on microprocessors or microcontrollers, or e. any combination of the above.

6) The length of the payload segments could be altered; or the payload segments could be made variable length.

7) The entire message set could be embedded in any physical layer coding scheme, for instance 8b/10b, in which case the control bytes would be 8b/10b's "K" code points and the rest of the bytes would be 8b/10b's "D" code points.

8) The ingress/egress ports and the switch core could communicate over any sort of communications channel, including at least:

a. parallel busses, b. differential serial electrical signals, c. optical links, or d. free-space optical.

9) The links between the ports and the switch core could operate at any bit rate.

10) The messages described in this invention could be intermixed with other messages and protocols on the same links.

11) Any of a variety of error detection/correction codes could be used in the message definitions.

12) The description of the preferred embodiment implies a global search in all core buffers for payload segments to forward when an arbitration victory is won by a particular flow (instead of sending a grant to the appropriate ingress, this leads to sending the buffered segment from the switch core itself). This parallel search can be accomplished by special-purpose CAM-like hardware, at little cost. However, there are other ways to accomplish this result without the need for a complete search of all buffers (at least all buffers associated with that ingress port). One such alternative is to keep a bit for each flow which indicates whether that flow has a payload segment in a buffer, and then have a linked-list through all buffers with payloads associated with that flow. This results is slightly more storage, but less logic. Depending on the technology (CMOS) costs, either alternative, or others, may be appropriate.

Additionally, there are many implementation details which can be carried out, which have only been briefly discussed thus far. In particular:

1) The synchronization of arriving, granted payload segments with the idle slot on the egress port should be carefully orchestrated by system-wide timing design.

2) The number of outstanding grants may be variable, depending on the fundamental latency of port-fabric communications.

3) Recovery mechanisms for the correction of incorrect request counts (due to physical bit errors in the counters or in message transmission) are preferably employed. Such recovery mechanisms are known to those of skill in the art.

In general, this description has not specified how a limited set of buffers should be shared among ports (ingress or egress), classes, or flows. This lack of specification is because embodiments of the present invention work with any such policy, and is not limited to any particular policy. Several possible policies are pointed out below, but only to illustrate the possibilities, not to limit the scope of this invention:

1) Divide all buffers into N separate pools, one per ingress port. Within these pools, reserve some minimum allocation per class, possibly with some excess being available to any class on demand. In this scenario, all egress ports contend for the shared per-class pools at each ingress, but each class is assured some minimal buffer quantity.

2) Again, divide all buffers into N separate pools. Use the top priority class for TDM (time division multiplexing) traffic. This implies that no egress is ever overallocated at this class, at least over any non-trivial time periods. Give this top priority class a small number of buffers sufficient to cover time of arrival jitter, and to allow the TDM flows to be carried without disappointing the TDM commitments. Give the second priority class (as many as) a full set of buffers for that class. This allows an opportunistic traffic type to maximally fill any ingress/egress bandwidth left after the TDM flows. Give a third priority class zero or very few buffers. This allows a lower priority opportunistic class to fill in most of the bandwidth left by the second class.

3) Place all buffers in a common central pool, to allow maximal sharing between ingress ports. Create a reservation control policy which allocates a minimum number of buffers per class and per egress, but with some number of uncommitted buffers which can supplement these minimal reservations. This style of policy maximizes sharing, while maintaining some minimal reservations per ingress and per class.

Any QoS and fairness policies can be supported by this invention. Thus no particular policies or arbiter structure has been specified. In other words, embodiments of the present invention will work equally well with any known arbitration technique, and with any fairness and QoS policies.

It may be useful to extend the format of one or more of the switch-core-to-ingress-port messages (grants, accepts, or drops) to carry information to the ingress port about the state of buffers in the switch core. This information could be used to guide the ingress ports as to when to try opportunistic behaviour, and when to try standard request-grant behaviour. The details of information to be carried depend, in part, on the nature of buffer sharing in the switch core.

The following are highly general descriptions of the areas of application of this invention: Data communications systems; Telecommunications systems; Storage Area Network (SAN) systems; Embedded Systems in which multiple entities communicate over switched internal paths; and Embedded Silicon Systems, in which multiple entities communicate over internal switched paths.

The following are more specific descriptions of example applications of this invention. Nevertheless, each of the following descriptions includes a very wide range of alternative designs and implementations: TCP/IP routers; MPLS routers; Routers for other protocols; Frame Relay switches; Ethernet switches; ATM switches; Voice Gateway switches; (Packetized) SONET STS-1 switches; (Packetized) SONET VT/TU switches; Fibre Channel (and other storage protocol) switches; Communications backbones for multiprocessor computer systems; Communications backbones for office automation devices, such as document copies/printers/faxers; Communications infrastructures for silicon chip products such as advanced microprocessors; Communications backbones for externally asynchronous crossbar systems which internally packetize their traffic.

The following areas of exclusion are provided to help define the areas of application: Time division multiplexing (TDM) grooming switch which do not packetize their traffic (e.g., TDM fabrics for SONET STS-1 and SONET VT/TU traffic); and pure asynchronous crossbar switches which do not packetize their traffic, but connect at the physical layer.

With respect to industrial applicability of embodiments of the present invention, prior to this development, there has been a very wide range of switching solutions. This wide range of solutions developed for a variety of reasons, but key among them was the fact that no switching technology provided an ideal solution in terms of the key parameters of switch design as described earlier in this disclosure:

1) ability of the switch core to enforce QoS, 2) while fairly allocating ingress and egress bandwidth, 3) ability to implement an economical/scaleable switch core (avoiding a need for excessive core buffers), and 4) ability of the switch core to offer minimal latency.

No switch core technology was able to offer all four features at once, so many divergent designs evolved to optimize one or the other of these features.

Embodiments of the present invention allow all four objectives to be met in the same, integrated design. Thus fewer switch designs can serve a wide range of applications. Switch cores will still need to differentiate on several features: number of ports, bandwidth per port, the number of classes of service offered, and the protocol carried. But for each such design point, there is no longer a need to design a range of switches for multiple tradeoffs of the above three requirements. So while switch design can not be reduced to one universal design, the forces driving excessive variability will be significantly reduced by this technology.

The implication of this is that the switching technology described in relation to embodiments of the present invention can produce switches which have the potential to apply to a wide range of applications, and hence to develop much large market share than any switch design has in today's highly fragmented switch fabric market.

To emphasize the economical nature of this fully QoS and fairness capable switch technology, the following points should be considered:

1) There need be no buffering in the core switch, which allows the core switch to scale to the maximum port count and bandwidth per port possible.

2) A limited number of buffers can be added to the core for a performance gain under load, but need not be present.

3) The general buffering requirement is imposed on the ingress ports. Other, related factors always dictate that buffers be available in the ingress ports. Often the number of buffers required to absorb bursty loads is much larger than the number of buffers required to support request-grant semantics. Finally, each ingress port need provide buffers for only one port, instead of having the switch core provide buffers for all ports. Due to the critical nature of cost and feasibility scaling in electronic systems, this avoidance of a critical core hot spot greatly enhances feasibility. It is more economical to distribute these buffers to the N ingress ports.

4) The logic required for ports to participate in these extended request-grant semantics are not at all burdensome or difficult to implement. Most existing ingress ports have at least this degree of complexity in their queuing and switch interface logic.

5) The logic required for the switch core to participate in these extended request-grant semantics are sufficiently practical to build very large switches. The primary difficulty is the arbiter design, which is not treated in this invention, but arbiters of very large size and capacity already exist in commercial products.

In summary, an extension to request-grant/virtual-output-queue switch interface protocol and semantics, and switch design is proposed. The motivation is to retain the QoS enforcement and fairness features of request-grant semantics, but to reduce the latency penalty of that approach. This goal is obtained by adding opportunistic behaviours to standard request-grant semantics. The first opportunistic behaviour is a cut-through feature, in which the ingress port submits a payload segment with its corresponding request, and hopes the switch fabric will be able to route the payload segment immediately to an otherwise idle egress ports. The second opportunistic behaviour comes into play when a cut-through is attempted but the desired egress port is otherwise busy; in this case, the buffering behaviour saves the opportunistically submitted payload segment in an otherwise free buffer for later processing. The final added behaviour occurs when an opportunistic payload-segment-with-request is made, and neither cut-through nor buffering is available; in this case, the payload segment is dropped, but the request is honoured for later arbitration. This final case causes all the opportunistic cases to collapse into the standard request-grant semantics when the opportunistic cases are unavailable. It can be easily proven that the added opportunistic cases do not compromise QoS and fairness in any way.

These extensions to request-grant semantics allow economical switch cores to be build for a wide range of applications. These extensions also lead to acceptable complexity and cost in the ingress ports; there is essentially no additional cost in the egress ports.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of opportunistic request-grant switching in a switch having ingress ports, a switch core, and egress ports, the method comprising:
   receiving a bid at the switch core front an origin ingress port, the bid having a request and its associated payload;
   forwarding the associated payload to a destination egress port as a cut-through in response to a determination of availability of the destination egress port;
   sending an accept message to the origin ingress port;
   dropping the associated payload in response to a determination of unavailability of the destination egress port; and
   retaining the request at the switch core for treatment as a request-grant request.

2. The method of claim 1, wherein the step of dropping the associated payload includes notifying the origin ingress port of the drop.

3. The method of claim 1 further comprising:
   storing the associated payload in a free buffer in response to a determination of availability of the free buffer and in response to a determination of unavailability of the destination egress port.

4. The method of claim 3, further comprising:
   dropping the associated payload in response to a determination of unavailability of the free buffer at the switch core.

5. The method of claim 4, further comprising:
   incrementing a flow count for a flow associate with the request.

6. The method of claim 1, wherein the treatment as the request-grant request includes:

receiving a payload segment associated with an earlier granted request from the origin ingress port upon granting of the request-grant request; and forwarding the payload segment associated with an earlier granted request from the switch core to the destination egress port.

7. An ingress device for communicating with a switch core in a data switch, comprising:

determining means for determining that a bid to be sent is to include a request and a its associated payload;

send means for sending the bid to the switch core; and payload management means for holding a copy of the associated payload for retransmission pending receipt of a grant message.

8. The ingress device of claim 7 wherein the determining means includes means for determining that the bid to be sent is to include the request and its associated payload in response to a determination in an immediately preceding time cycle that no grant has been received which requires sending a payload segment associated with an earlier granted request.

9. The ingress device of claim 7 wherein the payload management means includes means for discarding the copy of the associated payload in response to receipt of an accept message from the switch core.

10. The ingress device of claim 7 wherein the payload management means includes means for sending the copy of the associated payload to the switch core with a sequence number including a unique identifier to establish correspondence between the associated payload and the grant message in response to receipt of the grant message.

11. The ingress device of claim 7, further comprising a message type identifying means, for identifying a message type associated with a received message.

12. A switch core for opportunistic request-grant switching, the switch core being in communication with ingress ports and egress ports, the switch core comprising:

a receiver for receiving a bid at the switch core from an origin ingress port, the bid having a request and its associated payload;

transmit means for forwarding the associated payload to a destination egress port as a cut-through in response to a determination of availability of the destination egress port and for sending an accept message to the origin ingress port;

payload management means for dropping the associated payload in response to a determination of unavailability of the destination egress port; and storage means for retaining the request at the switch core for treatment as a request-grant request.

13. The switch core of claim 12, wherein the payload management means includes means for dropping the associated payload in response to a determination of unavailability of a free buffer at the switch core.

14. The switch core of claim 12, wherein the payload management means includes notification means for notifying the origin ingress port of the drop.

15. The switch core of claim 12 further comprising:

a buffer for retaining the associated payload; and a buffer availability indicator for indicating an availability of the buffer.

16. The switch core of claim 15 further comprising:

a request counter for a flow count for a flow associated with the request.

17. The switch core of claim 12, further comprises:

means for receiving a payload segment associated with an earlier granted request from the origin ingress port upon granting of the request-grant request; and means for forwarding the payload segment associated with an earlier granted request from the switch core to the destination egress port.

18. A computer-readable medium including statements and instructions which, when executed, cause a computer to perform the steps of:

receiving a bid at the switch core from an origin ingress port, the bid having a request and its associated payload;

forwarding the associated payload to a destination egress port as a cut-through in response to a determination of availability of the destination egress port;

sending an accept message to the origin ingress port;

dropping the associated payload in response to a determination of unavailability of the destination egress port; and retaining the request at the switch core for treatment as a request-grant request.

* * * * *